(12) United States Patent
Bai

(10) Patent No.: US 10,133,023 B2
(45) Date of Patent: Nov. 20, 2018

(54) DEVICE FOR DRIVING A LENS FRAME

(71) Applicant: Nidec Copal Corporation, Tokyo (JP)

(72) Inventor: Longji Bai, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 51 days.

(21) Appl. No.: 15/505,978

(22) PCT Filed: Aug. 24, 2015

(86) PCT No.: PCT/JP2015/073683
§ 371 (c)(1),
(2) Date: Feb. 23, 2017

(87) PCT Pub. No.: WO2016/031756
PCT Pub. Date: Mar. 3, 2016

(65) Prior Publication Data
US 2017/0254979 A1    Sep. 7, 2017

(30) Foreign Application Priority Data
Aug. 29, 2014  (JP) ................................ 2014-176466

(51) Int. Cl.
*G02B 27/64*  (2006.01)
*G02B 7/10*  (2006.01)
(Continued)

(52) U.S. Cl.
CPC ................ *G02B 7/10* (2013.01); *G02B 7/02* (2013.01); *G02B 7/04* (2013.01); *G02B 7/09* (2013.01);
(Continued)

(58) Field of Classification Search
CPC .. G02B 27/64; G02B 27/646; H04N 5/23248; H04N 5/23264; H04N 5/2328; H04N 5/23287
(Continued)

(56) References Cited

U.S. PATENT DOCUMENTS 5,930,042 A    7/1999  Miyamoto et al.
9,423,631 B2 *  8/2016  Cho .................... G02B 13/0015
(Continued)

FOREIGN PATENT DOCUMENTS

CN         103792758 A    5/2014
CN         104429055 A    3/2015
(Continued)

OTHER PUBLICATIONS

International Search Report dated Nov. 2, 2015 issued in PCT International Application No. PCT/JP2015/073683.

*Primary Examiner* — Arnel C Lavarias
(74) *Attorney, Agent, or Firm* — Troutman Sanders LLP

(57) ABSTRACT

The lens driver having a lens frame; a movable member supports the lens frame so as to be able to move in the direction of the optical axis; a base member supporting the movable member through contact so as to enable movement in the directions perpendicular to the optical axis; elastic members with one end connected to the movable member and the other end connected to the base member, for pressing the movable member against the base member side elastically; a first driving portion for driving the lens frame in the direction of the optical axis; and second driving portions for driving the lens frame in directions that are perpendicular to the optical axis, wherein: power is supplied to the first driving portion, which is provided on the movable member side, through the elastic members from an interconnecting circuit that is provided on the base member.

7 Claims, 9 Drawing Sheets

(51) Int. Cl.
*G02B 7/04* (2006.01)
*G02B 7/09* (2006.01)
*G02B 7/02* (2006.01)
*G03B 5/02* (2006.01)
*H04M 1/02* (2006.01)

(52) U.S. Cl.
CPC ............ *G02B 27/646* (2013.01); *G03B 5/02* (2013.01); *H04M 1/0264* (2013.01); *G03B 2205/0015* (2013.01); *G03B 2205/0069* (2013.01); *G03B 2217/002* (2013.01)

(58) Field of Classification Search
USPC ....... 359/554, 557; 250/201.1, 201.2, 201.4; 396/52, 55
See application file for complete search history.

(56) References Cited

U.S. PATENT DOCUMENTS

| | | | |
|---|---|---|---|
| 9,451,167 B2* | 9/2016 | Lee | ............... G02B 7/08 |
| 2013/0070148 A1 | 3/2013 | Kim | |
| 2013/0201559 A1 | 8/2013 | Minamisawa et al. | |
| 2014/0375875 A1 | 12/2014 | Yeo | |
| 2015/0168679 A1 | 6/2015 | Yeo | |
| 2015/0185587 A1 | 7/2015 | Kim | |

FOREIGN PATENT DOCUMENTS

| | | |
|---|---|---|
| EP | 2517457 A2 | 10/2012 |
| EP | 2868076 A1 | 5/2015 |
| JP | H07168231 A | 7/1995 |
| JP | 2010039072 A | 2/2010 |
| JP | 2011133702 A | 7/2011 |
| JP | 2012137774 A | 7/2012 |
| JP | 2013-156292 A | 8/2013 |
| JP | 2014085624 A | 5/2014 |
| JP | 2014-132367 A | 7/2014 |
| JP | 2015522849 A | 8/2015 |
| KR | 20110073043 A | 6/2011 |
| KR | 20140003216 A | 1/2014 |
| WO | 2011/078040 A1 | 6/2011 |
| WO | 2011/078614 A2 | 6/2011 |
| WO | 2014/003493 A1 | 1/2014 |

* cited by examiner

Cross-Sectional Diagram along Section A-A

Cross-Sectional Diagram along Section A-A

DEVICE FOR DRIVING A LENS FRAME

CROSS-REFERENCE TO RELATED APPLICATIONS

This is a U.S. national phase application under 35 U.S.C. § 371 of International Patent Application No. PCT/JP2015/073683, filed Aug. 24, 2015, and claims benefit of priority to Japanese Patent Application No. 2014-176466, filed Aug. 29, 2014. The entire contents of these applications are hereby incorporated by reference.

FIELD OF TECHNOLOGY

The present invention relates to a lens driving device.

BACKGROUND

There are known lens driving devices (camera modules, and the like) equipped with mechanisms for driving a lens frame in the optical axial direction (for example, AF (Auto Focus) mechanisms) and mechanisms for driving the lens frame within the plane that is perpendicular to the optical axis (for example, OIS (Optical Image Stabilizer) mechanisms) (referencing, for example, Japanese Unexamined Patent Application Publication No. 2014-132367 and Japanese Unexamined Patent Application Publication No. 2013-156292).

In the prior art set forth in Japanese Unexamined Patent Application Publication No. 2014-132367, a lens frame is supported in a suspended state using suspension wires in order to support the lens frame so as to be able to move in a direction that is perpendicular to the optical axis. When the lens frame is supported by such suspension wires, there is a problem in that the unit structure must be complex due to the need for a structure wherein the lens frame is held on the suspension wires without bending or flexing greatly when subjected to a large force, such as the shock of being dropped.

In contrast, there is a known support through contact, through spherical bodies (bearings), as a mechanism to support the lens frame so as to enable movement in the directions that are perpendicular to the optical axis (referencing Japanese Unexamined Patent Application Publication No. 2013-156292). While this enables high durability in respect to mechanical shock for a drop impact, or the like, suspension wires that can also be used as power supply paths are not used, it becomes necessary to have a power supply structure, such as for connecting a separate flexible printed substrate for driving the AF, and thus there is a problem in that it becomes difficult to reduce the size of the unit due to the need to secure space for equipping this power supplying structure.

Moreover, while in the prior art in Japanese Unexamined Patent Application Publication No. 2013-156292, the restoration to the neutral position in the OIS mechanism is through magnetic attraction through a magnet of the movable portion and a yoke of a base portion, with this there are problems in that the design for laying out the yoke that is provided in the base portion is complex, and in that the number of components is increased and the unit weight is increased through the provision of the additional yoke.

In the present invention, the handling of such problems is an example of the problem to be solved. That is, the object of the present invention is to have durability to mechanical shock, such as a drop impact, to avoid increased complexity in the structure, to enable a reduction in weight and a reduction in size of the unit, and to avoid an increase in the number of components, in lens driving for driving a lens frame in the optical axial direction and also driving the lens frame in the directions that are perpendicular to the optical axis as well.

SUMMARY

In order to achieve such an object, the lens driving device of the present invention is equipped with the following structures:

A lens driving device having a lens frame; a movable member for supporting the lens frame so as to be able to move in the optical axial direction; a base member for supporting, through contact, the movable member so as to be able to move in a direction that is perpendicular to the optical axis; an elastic member that is connected on one end to the movable member side and connected on the other end to the base member side, to press the movable member elastically against the base member side; a first driving portion for driving the lens frame in the optical axial direction; and a second driving portion for driving the lens frame, through the movable member, in a direction that is perpendicular to the optical axis, wherein: power is supplied to the first driving portion, which is provided on the movable member side, through the elastic member from an interconnecting circuit that is provided on the base member.

DETAILED DESCRIPTION

Figure 1:
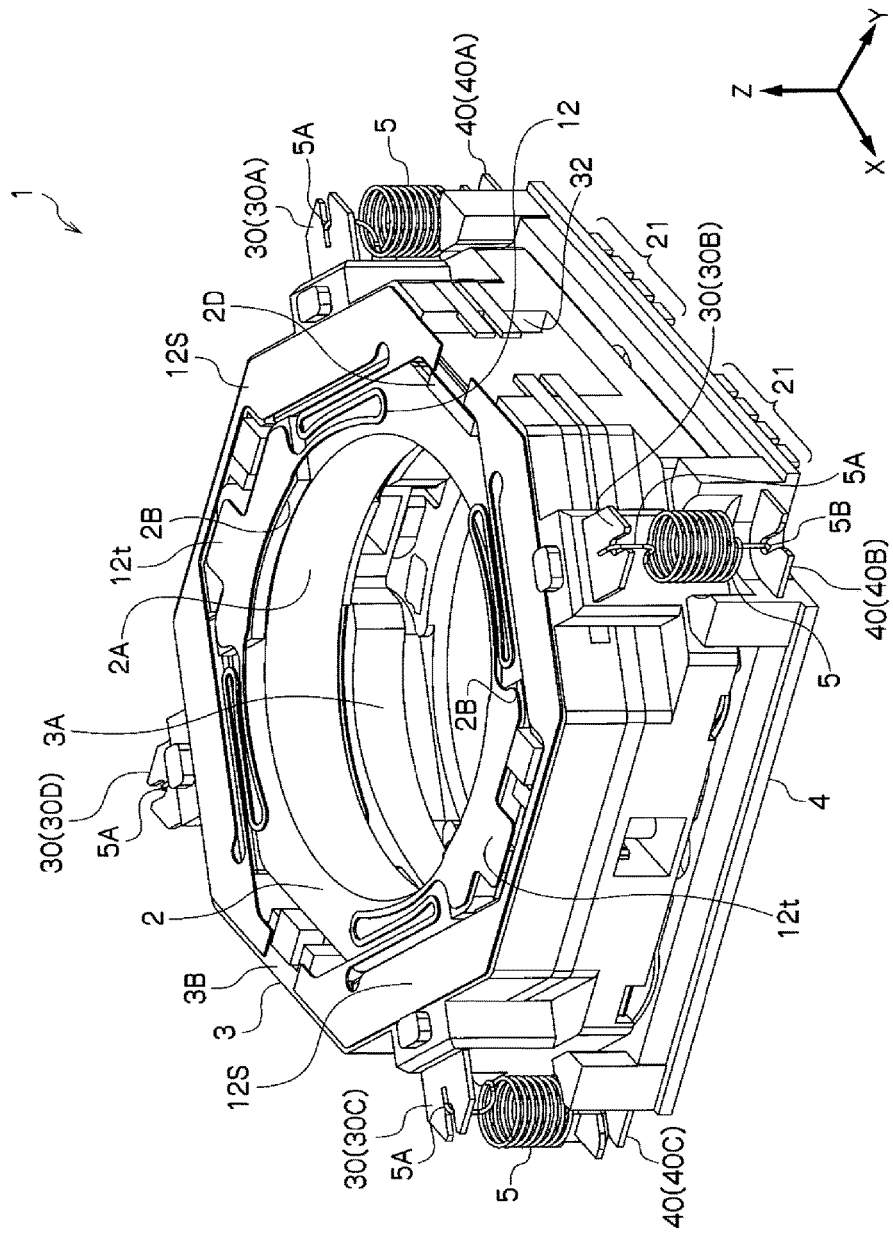
FIG. 1 is an assembly perspective diagram illustrating the overall structure of a lens driving device according to an example according to the present invention.

A lens driving device according to an example according to the present invention comprises a lens frame, a movable member, a base member, elastic members, a first driving portion, and second driving portions. Note that the movable member supports the lens frame so as to be able to move in the direction of the optical axis of the lens (hereinafter termed simply the "optical axis"), and itself is supported, through contact, so as to be able to move, relative to the base member, in the directions that are perpendicular to the optical axis. Here support through contact refers to being supported in a state that is in contact with the supporting portion of the base member. The elastic members is connected on one end to the movable member side and connected on the other end to the base member side, to press the movable member elastically against the base member side. An example of an elastic member is a spring member that has tensile elasticity, where the movable member is pressed against a supporting portion of the base member by the tensile elastic force of the spring member.

The first driving portion drives the lens frame in the optical axial direction through supplying an electric current, and, for example, structures the driving portion of a focal point adjusting mechanism (an AF mechanism). The second driving portions drive the lens frame, through the movable member, in directions that are perpendicular to the optical axis through supplying electric currents, to drive the lens frame, which is supported on the movable member, in directions that are perpendicular to the optical axis, to structure the driving portions of, for example, a mechanism for correcting for camera shaking (an OIS mechanism). The first and second driving portions may be structured, for example, from driving coils that produce electromagnetic driving forces. Moreover, the first driving portion for driving the lens frame in the optical axial direction is provided on the movable member side (on the movable member or the lens frame), and power is supplied to the first driving portion through the elastic members from interconnecting circuits that are provided on the base member.

The lens driving device having such a distinctive feature has durability to mechanical shock, such as a drop impact, through the movable member that supports the lens frame being supported in contact with the base member, rather than being supported in a suspended state. Moreover, because, in this lens driving device, the movable member is pressed into contact with the base member by the elastic force of the elastic member, there is no need for, for example, a mechanism for limiting the movement of the base member, making it possible to avoid increased complexity of the structure. Moreover, in this lens driving device, the movable member can be returned by the elastic force of the elastic member to the neutral position in the directions that are perpendicular to the optical axis, thus eliminating the need for the provision of a separate yoke, as has been necessary in the prior art, enabling a reduction in the unit weight and making it possible to avoid an increase in the number of components. Furthermore, the elastic members can also be used for the power supply path, eliminating the need for room for interconnections, such as a flexible printed substrate, as has been necessary in the prior art, thus enabling a reduction in size.

An example according to the present invention will be explained below in reference to the drawings. In the various drawings below, identical reference symbols are assigned to identical positions, and redundant explanations are omitted. In the drawings, the Z direction indicates the optical axial direction, and the X and Y directions indicate directions that are perpendicular to the optical axis.

Figure 2:
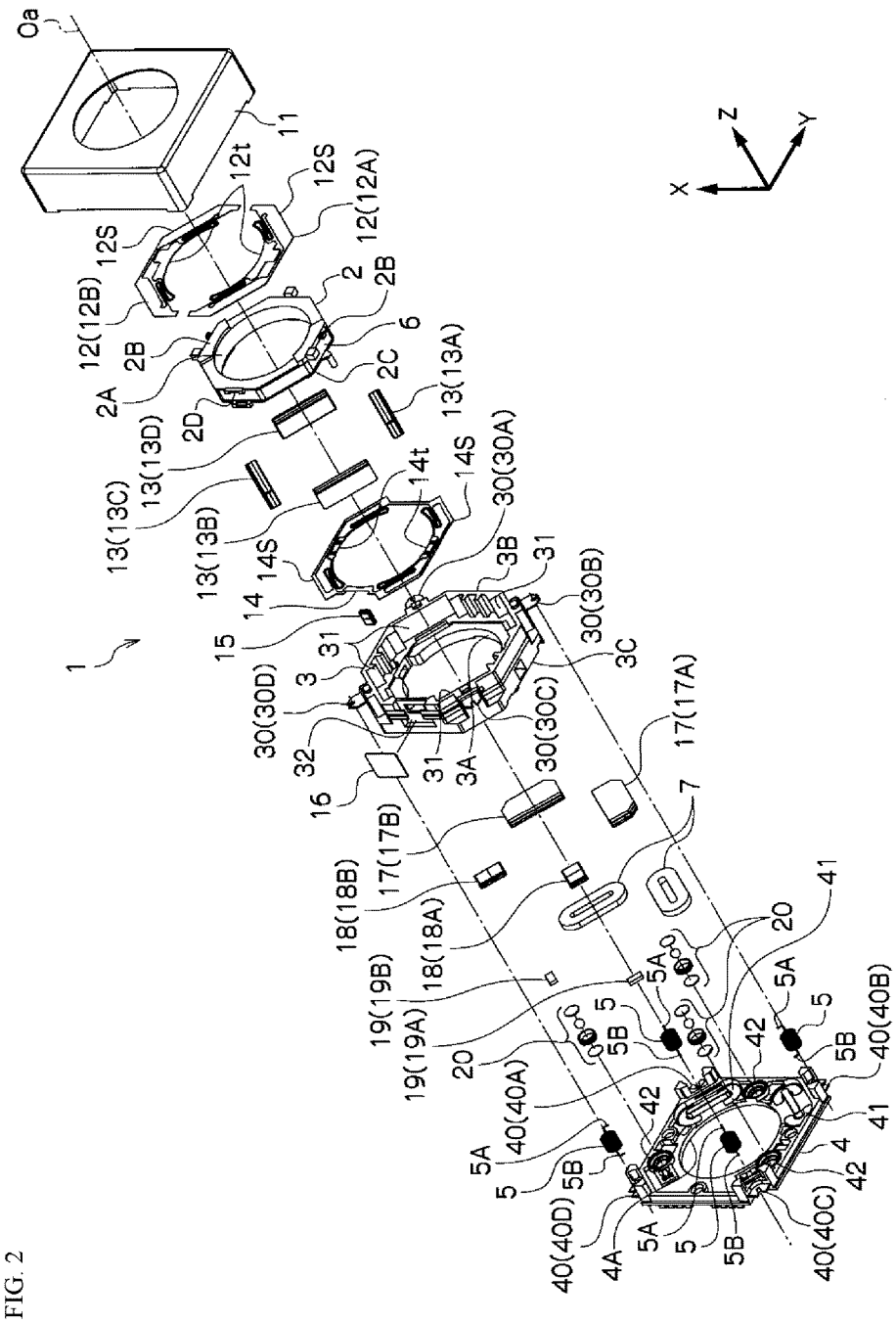
FIG. 2 is an exploded perspective diagram illustrating the overall structure of a lens driving device according to an example according to the present invention.

FIG. 1 and FIG. 2 are explanatory diagrams illustrating the overall structure of a lens driving device according to an example according to the present invention (wherein FIG. 1 is an assembly perspective diagram in FIG. 2 is an exploded perspective diagram). The lens driving device 1 comprises: a lens frame 2; a movable member 3 that supports the lens frame 2 so as to be able to move in the direction of the optical axis Oa; a base member 4 that supports the movable member 3 through contact so as to enable movement in the directions that are perpendicular to the optical axis Oa; and elastic members 5 with one end connected to the movable member 3 side and the other end connected to the base member 4 side, for pressing the movable member 3 against the base member 4 side elastically.

The lens frame 2 is provided with a lens installation opening 2A into which a lens barrel, not shown, is installed, and is provided with leaf spring connecting portions at a top end portion 2B and a bottom end portion of 2C thereof, so as to be supported, through the top leaf spring 12 and the bottom leaf spring 14, so as to enable movement, through the movable member 3, in the optical axial direction. The movable member 3 is a frame that is provided with a center opening portion 3A that is coaxial with the lens installation opening 2A, and is disposed so as to surround the lens frame 2.

The top leaf spring 12 (12A and 12B) is divided in two, where each of the top leaf springs 12A and 12B is provided with an inner connecting portion 12$t$ and an outer connecting portion 12S, where the inner connecting portion 12$t$ is connected to the top end portion 2B of the lens frame 2, and the outer connecting portion 12S is connected to the top end portion 3B of the movable member 3. Moreover, in the bottom leaf spring 14, the inner connecting portion 14$t$ is connected to the bottom end portion 2C of the lens frame 2 and the outer connecting portion 14S is connected to the bottom end portion 3C of the movable member 3. The lens frame 2 is supported elastically, relative to the movable member 3, through these top leaf spring 12 and bottom leaf spring 14.

The movable member 3 is supported, through contacting the supporting member 20, on supporting portions 42 of the base member 4. The supporting member 20 is a rolling element or a sliding element, and, for example, may be a spherical rolling element that is a bearing portion for the supporting portion 42. The base member 4 has a center opening portion 4A provided in the center thereof, where supporting portions 42 are disposed in a plurality of positions at equal intervals (for example, three positions) on the periphery of the center opening Portion 4A.

The movable member 3 and the base member 4 are connected by elastic members 5. The movable member 3 is provided with connecting portions 30 that protrude in directions that are perpendicular to the optical axis Oa, and the base member 4 is also provided with connecting portions 40 that protrude in directions that are perpendicular to the optical axis Oa. The elastic members 5 are disposed between the connecting portions 30 and 40, where the end portions 5A and 5B of the elastic members 5 are connected to the respective connecting portions 30 and 40.

The elastic members 5 are disposed in a plurality thereof at locations that have axial symmetry around the optical axis Oa. In the illustrated example, the connecting portions 30 (30A, 30B, 30C, and 30D) on the movable member 3 side are provided at a plurality of locations (for example, at four locations) that are equally spaced around the optical axis Oa, and connecting portions 40 (40A, 40B, 40C, and 40D) of the base member 4 side are provided in a plurality of locations (for example, 4 locations), at locations that are facing those of the connecting portions 30.

The lens driving device 1 comprises: a first driving portion 6 for driving the lens frame 2, through a moveable member 3, in the direction of the optical axis Oa, and second driving portions 7 for driving the lens frame 2 in directions that are perpendicular to the optical axis Oa. When the lens driving device 1 is used in a camera unit, the first driving portion 6 serves as the driving portion for the AF mechanism, and the second driving portions 7 serve as driving portions for the OIS mechanism.

The first driving portion 6 is structured from a driving coil, and is wrapped onto the body portion of the lens frame 2 around the optical axis Oa. The first driving portion 6 drives the lens frame 2 in the direction of the optical axis Oa in cooperation with a plurality of driving magnets 13 (13A, 13B, 13C, and 13D) that are held in a magnet retaining portion 31 of the movable member 3.

In the example that is illustrated, a magnet retaining portion 2D is provided in the lens frame 2, and a position detecting magnet 15 is disposed in the magnet retaining portion 2D. Moreover, a driving circuit retaining portion 32 is provided in the movable member 3, and a driving circuit (IC) 16 of a type with a built-in Hall element for detecting the magnetism of the position detecting magnet 15 is provided in the driving circuit retaining portion 32.

Each second driving portion 7 is structured from a driving coil that is held in a coil holder 41 of the base member 4, and drives the lens frame 2, through the movable member 3, in a direction that is perpendicular to the optical axis Oa, together with driving magnets 17 (17A and 17B) that are disposed in the bottom end portion 3C of the movable member 3. Detecting magnets 18 (18A and 18B) are provided in two positions in the movable member 3, and position detecting sensors (Hall elements) 19 (19A and 19B) are disposed in the base member 4 at positions corresponding to the position detecting magnets 18 (18A and 18B).

The lens driving device 1, if necessary, is covered, on the outer peripheral edge of the base member 4, with a cover 11 that covers the movable member 3 and the elastic members 5, when installed in an electronic device, or the like.

FIGS. 3(a) and 3(b) and FIG. 4, and FIGS. 5(a) and 5(b) and FIG. 6, show the connected states of the elastic members 5. As described above, an end portion 5A on one end side of each elastic member 5 is connected to a connecting portion 30 of the movable member 3, and the end portion 5B on the other end side is connected to a connecting portion 40 of the base member 4. At this time, the connecting portions 30 and 40 protrude in directions that are perpendicular to the optical axis Oa, and the elastic members 5 are disposed so as to be essentially parallel to the optical axis Oa when no current is applied.

Figure 3A:
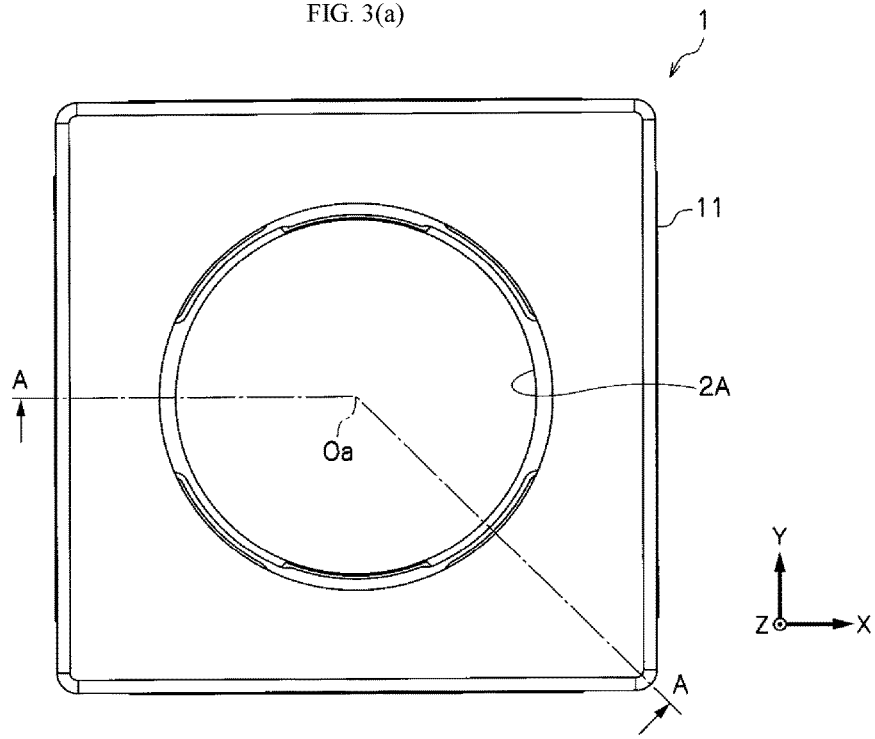
FIG. 3(a) and FIG. 3(b) are explanatory diagrams illustrating the overall structure of a lens driving device according to an example according to the present invention (wherein FIG. 3(a) is a plan view and FIG. 3(b) is a cross-sectional view along the section A-A in FIG. 3(a)).
Figure 3B:
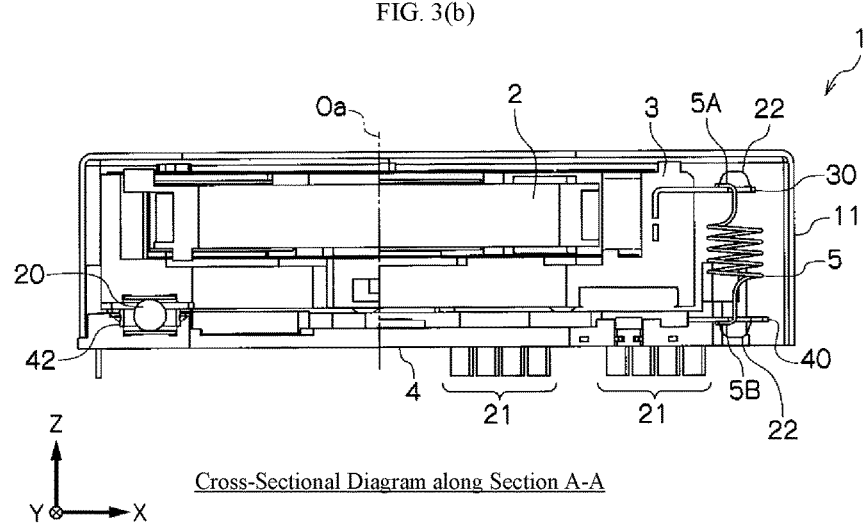
Figure 4:
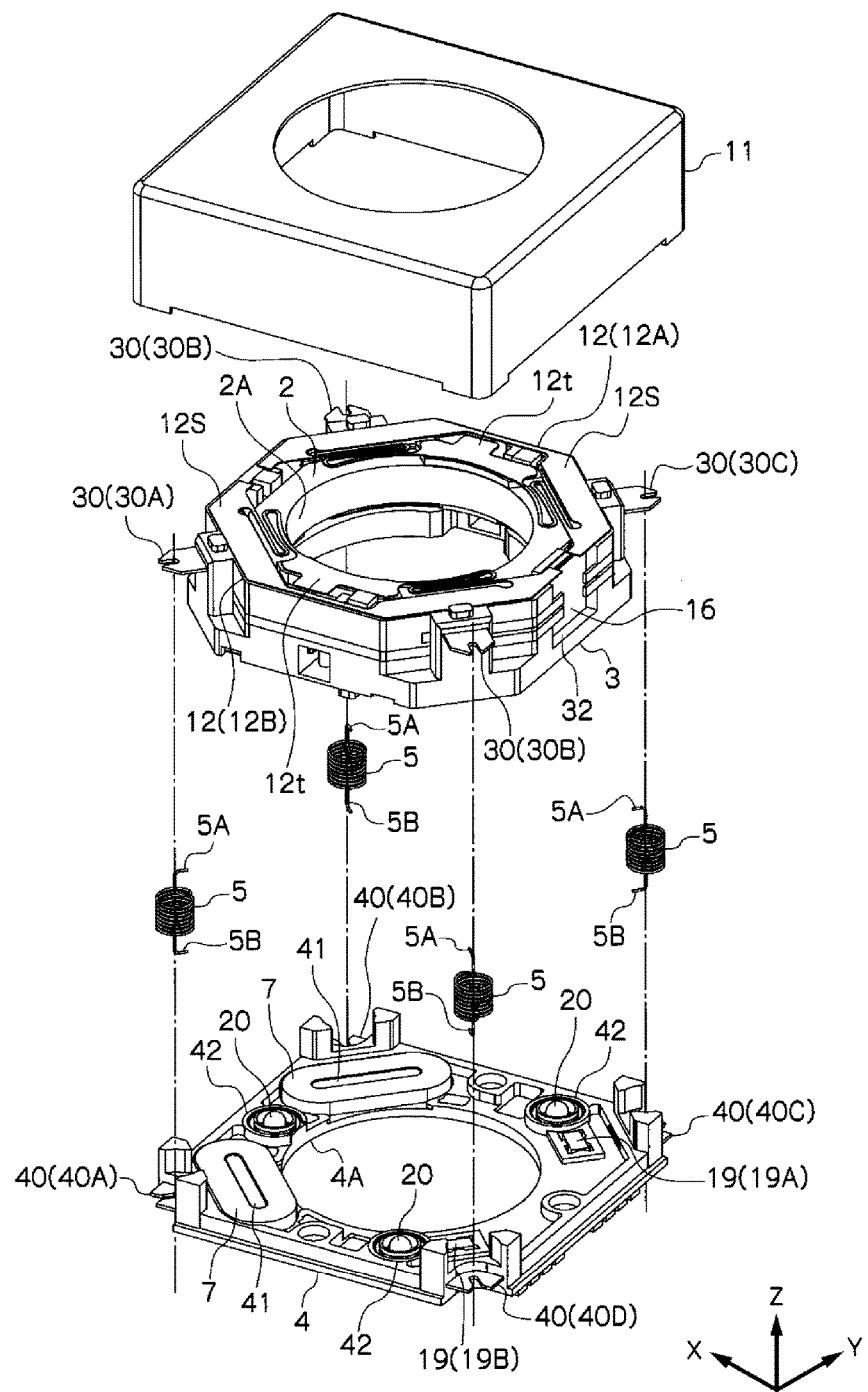
FIG. 4 is an explanatory diagram illustrating the overall structure of a lens driving device according to an example according to the present invention.
Figure 5A:
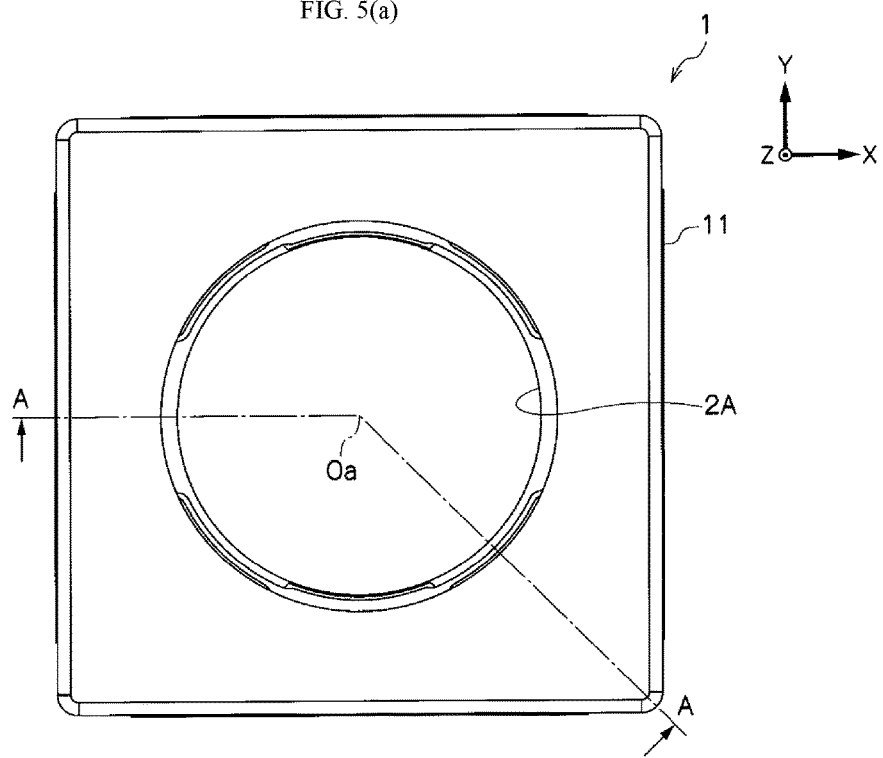
FIG. 5(a) and FIG. 5(b) are explanatory diagrams illustrating the overall structure of a lens driving device according to an example according to the present invention (wherein FIG. 5(a) is a plan view and FIG. 5(b) is a cross-sectional view along the section A-A in FIG. 5(a)).
Figure 5B:
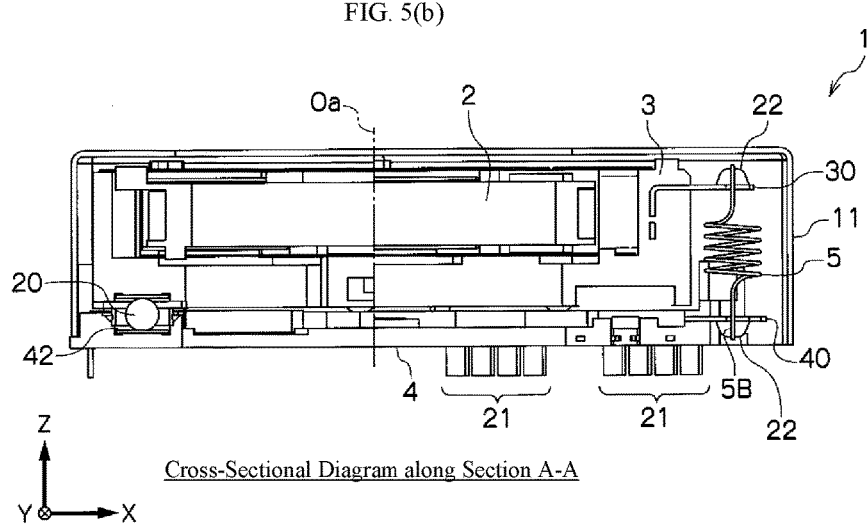
Figure 6:
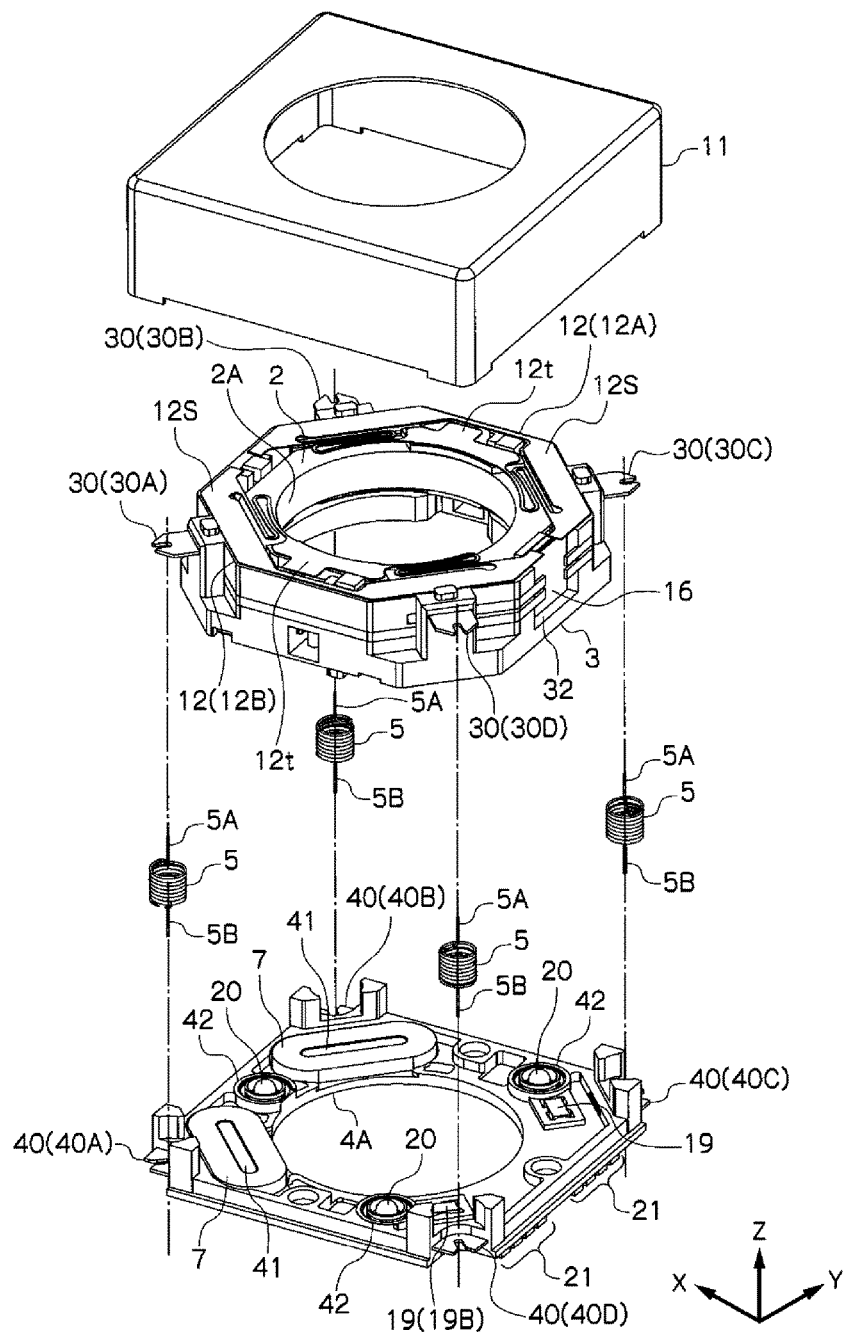
FIG. 6 is an explanatory diagram illustrating the overall structure of a lens driving device according to an example according to the present invention.

The end portions 5A and 5B of the elastic member 5, as illustrated in FIGS. 3(a) and 3(b) and FIG. 4, may be connected with the tip end portions bent so as to engage with the connecting portions 30 and 40, or, as illustrated in FIGS. 5(a) and 5(b) and FIG. 6, the tip end portions may extend in straight lines to connect through passing through the connecting portions 30 and 40. The end portions 5A and 5B of the elastic member 5 are secured through joining material 22, such as solder, to the connecting portions 30 and 40. As illustrated, the end portions 5A and 5B of the elastic member 5 pass through the connecting portions 30 and 40, to be secured through the joining material 22 on the surface on the side that is opposite from the side that faces the elastic member 5. Securing in this way makes it possible to apply the joining material 22 to the end portions 5A and 5B and the connecting portions 30 and 40 in a state wherein the elastic members 5 are held parallel to the optical axis Oa through jigs, or the like. The plurality of elastic members 5 that are disposed parallel to the optical axis Oa at positions that are axially symmetrical in relation to the optical axis Oa hold the movable member 3 elastically at a neutral position on the base member 4. This makes it possible to return the lens frame 2 to the neutral position through the elastic forces of restitution of the plurality of elastic members 5 when no current is applied by the second driving portion 7.

Figure 7:
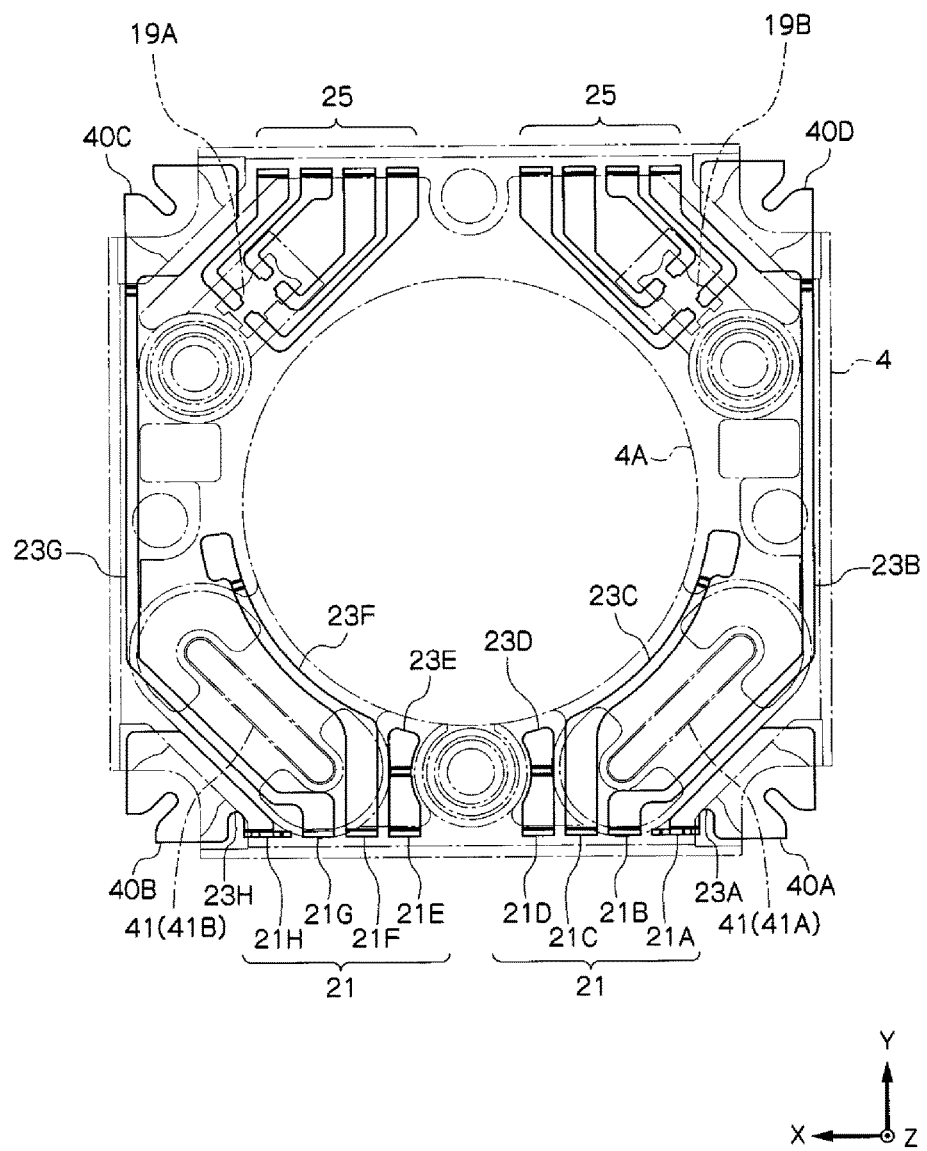
FIG. 7 is an explanatory diagram illustrating the power supply path of a lens driving device according to an example according to the present invention.
Figure 8:
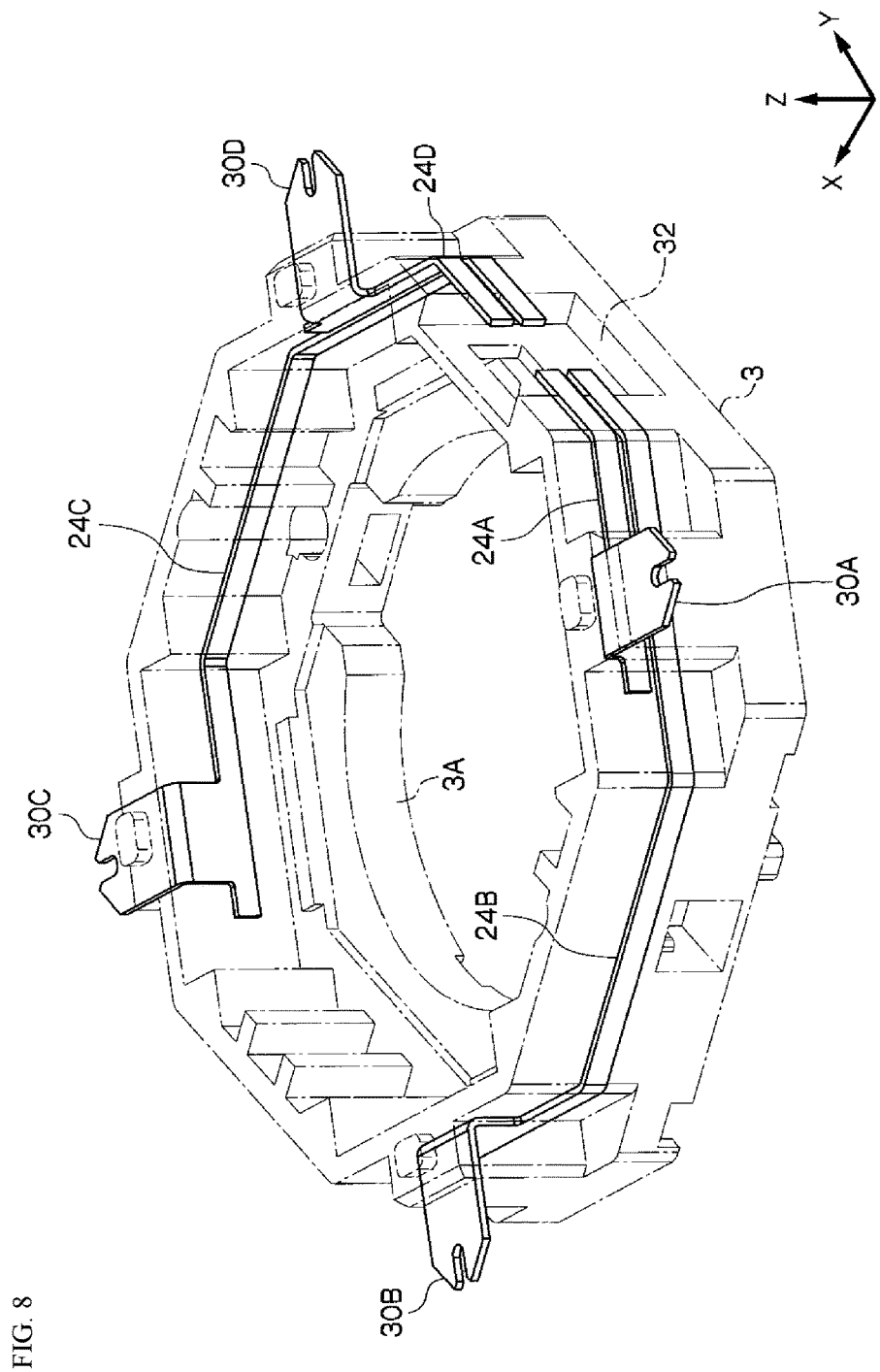
FIG. 8 is an explanatory diagram illustrating the power supply path of a lens driving device according to an example according to the present invention.

The power supply paths to the first driving portion 6 and the second driving portion 7 will be explained using FIG. 7, FIG. 8, and other figures. The base member 4 is provided with a plurality of input terminals 21. The plurality of input terminals 21 are disposed lined up on one end of the square base member 4, where the individual input terminals 21 (21A, 21B, 21C, 21D, 21E, 21F, 21G, and 21H) are connected to the respective interconnecting circuits 23A, 23B, 23C, 23D, 23E, 23F, 23G, and 23H. Here the interconnecting circuit 23A connects the input terminal 21A to a connecting portion 40A, and the interconnecting circuit 23B connects the input terminal 21B to the connecting portion 40D. The interconnecting circuit 23C connects the input terminal 21C to one end side of the second driving portion (the driving coil) 7 that is held in the coil holder 41A, and the interconnecting circuit 23D connects the input terminal 21D to the other end side of the second driving portion (the driving coil) 7 that is held in the coil holder 41A.

Moreover, the interconnecting circuit 23E connects the input terminal 21E to one end side of the second driving portion (driving coil) 7 that is held in the coil holder 41B, and the interconnecting circuit 23F connects the input terminal 21F to the other end side of the second driving portion (driving coil) 7 that is held in the coil holder 41B, where the interconnecting circuit 23G connects the input terminal 21G to the connecting portion 40C, and the interconnecting circuit 23H connects the input terminal 21H to the connecting portion 40B.

Moreover, the connecting portions 40A, 40B, 40C, and 40D of the base member 4 are connected to the connecting portions 30A, 30B, 30C, and 30D of the movable member 3 that serve as the electrical terminal portions, through the elastic members 5 that form the electrical interconnecting paths. Furthermore, the connecting portions 30A, 30B, 30C, and 30D are connected respectively to the interconnecting circuits 24A, 24B, 24C, and 24D that are provided on the movable member 3, where the end portions of the interconnecting circuits 24A, 24B, 24C, and 24D are connected within the driving circuit retaining portion 32, and are held there to be connected to the driving circuits 16 that are installed in the movable member 3.

The interconnecting circuits 23A through 23H that are provided in the base member 4 and the interconnecting circuits 24A through 24D that are provided in the movable member 3 are formed integrally with the base member 4 and the movable member 3, or interconnections may be formed using printing technology or layering technology on the base member 4 and the movable member 3.

The operation of such a lens driving device 1 will be explained. The operation by the first driving portion 6 (that is, AF driving) will be explained first. Of the plurality of input terminals 21 of the base member 4, the input terminals 21A, 21B, 21G, and 21H are connected to the driving circuit 16, which is mounted on the movable member 3, from the interconnecting circuits 23A, 23B, 23G, and 23H that are provided on the base member 4 side, through the elastic members 5 and the interconnecting circuits 24A, 24B, 24C, and 24D of the movable member 3. Moreover, the output terminals of the driving circuit 16 are connected respectively to both ends of the coil of the first driving portion 6 through the top leaf springs 12A and 12B that are divided in two. Of the input terminals 21A, 21B, 21G, and 21H, two terminals serve as power supply input terminals and the other two terminals serve as control signal input terminals.

The control and power supply signals that are inputted into the input terminals 21A, 21B, 21G, and 21H are connected from the interconnecting circuits 23A, 23B, 23G, and 23H that are provided on the base member through the elastic members 5 and the interconnecting circuits 24A, 24B, 24C, and 24D of the movable member 3, to be inputted into the driving circuit 16, where the driving circuit 16 supplies power to the first driving portion 6 based on the inputted signals and the position detection signal of the build-in Hall element, to control the position of the lens frame 2 along the optical axial direction.

The operation by the second driving portion 7 (that is, OIS driving) will be explained next. Of the plurality of input terminals 21 of the base member 4, the input terminals 21C, 21D, 21E, and 21F, as described above, are connected to the end portions of the two second driving portions (driving coils) 7 through the interconnecting circuits 23C, 23D, 23E, and 23F that are provided on the base member 4 side. Moreover, eight outer connecting terminals 25, for connecting to 4×2 terminals of two position detecting sensors (Hall elements) 19A and 19B, are provided on the base member 4, and detection signals of the position detecting sensors 19A and 19B are sent to the controlling portions, not shown. The controlling portions send control and power supply signals to the input terminals 21C, 21D, 21E, and 21F based on the detection signals of the position detecting sensors 19A and 19B, where power is supplied to the second driving portions 7 based on these control and power supply signals, to control the lens frame 2 through the movable member 3 in the directions that are perpendicular to the optical axis.

Given this lens driving device 1, the lens frame 2 that is supported movably on the movable member 3 by the top leaf springs 12 and the bottom leaf spring 14 has the position thereof in the optical axis Oa direction controlled through moving to the position of balance between the driving force that is produced in the first driving portion 6 through the electric current that is applied to the first driving portion 6 and the elastic forces of the top leaf springs 12 and the bottom leaf spring 14. Moreover, the position of the lens frame 2 that is supported on the movable member 3 is controlled in the directions that are perpendicular to the optical axis Oa through the movable member 3, which is supported, through contact, on the base member 4, moving to the position of balance between the driving forces that are produced by the two second driving portions 7, through the application of electric currents to the second driving portions 7, and the elastic forces of the plurality of elastic members 5.

Because, in such a lens driving device 1, the movable member 3 that supports the lens frame 2 is supported, through contact, on the base member 4, and thus has high durability to mechanical shock, such as a drop impact. Moreover, when no electric current is applied to the second driving portions 7, the lens frame 2 returns to the neutral position through the elastic force of restitution of the elastic members 5, and thus it is possible to eliminate the yoke that has been necessary when returning to the neutral position through magnetic attraction, thus making it possible to reduce the weight of the unit and to reduce the number of components. Moreover, because the elastic members 5 also serve as the paths for supplying power to the first driving portion 6, this enables a reduction in size of the space for interconnections.

Figure 9:
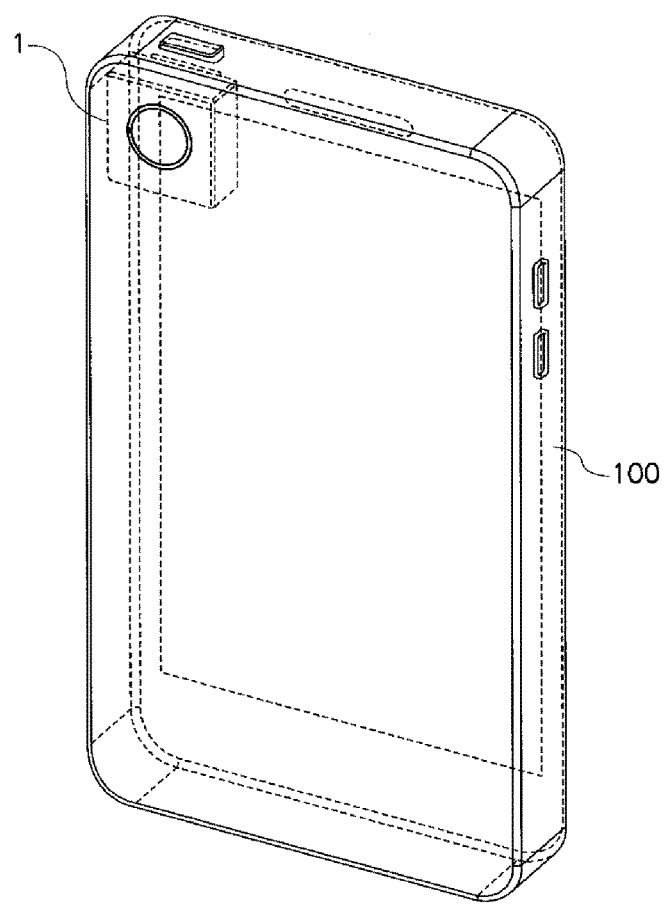
FIG. 9 is an explanatory diagram illustrating an electronic device provided with a lens driving device according to an example according to the present invention.

FIG. 9 shows an electronic device 100 that is provided with a lens driving device 1 (the mobile telephone, smart phone, tablet terminal, mobile camera, or the like). Such an electronic device 100 enables production of a device wherein size and weight have been reduced, due to reductions in weight and size reduction of the lens driving device 1, and which has high durability to mechanical shock.

While examples according to the present invention were described in detail above, referencing the drawings, the specific structures thereof are not limited to these examples, but rather design variations within a range that does not deviate from the spirit and intent of the present invention are also included in the present invention. Moreover, insofar as there are no particular contradictions or problems in purposes or structures, or the like, the technologies of the various examples described above may be used together in combination.

The invention claimed is:

1. A lens driving device comprising:
a lens frame;
a movable member supporting the lens frame so as to be able to move in an optical axial direction;
a base member supporting, through contact, the movable member so as to be able to move in a direction that is perpendicular to an optical axis;
an elastic member that is connected on one end to the movable member and connected on the other end to the base member, to press the movable member elastically against a base member side;
a first driver driving the lens frame in the optical axial direction; and
a second driver driving the lens frame, through the movable member, in a direction that is perpendicular to the optical axis, wherein:
power is supplied to the first driver, which is provided on a movable member side, through the elastic member from an interconnecting circuit that is provided on the base member.

2. The lens driving device as set forth in claim 1, wherein:
the elastic member is disposed in a plurality of positions that are axially symmetrical around the optical axis.

3. The lens driving device as set forth in claim 1, wherein:
the base member is provided with a bearing portion that supports, through contact, the movable member.

4. The lens driving device as set forth in claim 1, wherein:
both end portions of the elastic member are disposed between connecting portions that protrude in a direction that is perpendicular to the optical axis, and an end portion of the elastic member is secured by a joining material in a state wherein the end portion passes through the connecting portion.

5. The lens driving device as set forth in claim 1, wherein:
the base member is provided with an input terminal that is connected to the interconnecting circuit; and the movable member is provided with an interconnecting circuit that arrives at the first driving portion from one end of the elastic member.

6. The lens driving device as set forth in claim 5, wherein:
a driving circuit controlling driving of the lens frame is mounted on the movable member.

7. An electronic device comprising a lens driving device as set forth in claim 1.

* * * * *